US008589872B2

(12) United States Patent
Cowtan

(10) Patent No.: US 8,589,872 B2
(45) Date of Patent: Nov. 19, 2013

(54) SYSTEM AND METHOD FOR VARIABLE TYPE IDENTIFICATION

(75) Inventor: Mark Gregory Cowtan, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 1330 days.

(21) Appl. No.: 12/125,291

(22) Filed: May 22, 2008

(65) Prior Publication Data

US 2008/0313608 A1      Dec. 18, 2008

(30) Foreign Application Priority Data

Jun. 12, 2007  (CA) ........................................ 2591361
Jun. 12, 2007  (CA) ........................................ 2591382

(51) Int. Cl.
  *G06F 9/44* (2006.01)
(52) U.S. Cl.
  USPC ........................................... 717/111; 717/106
(58) Field of Classification Search
  None
  See application file for complete search history.

(56) References Cited

U.S. PATENT DOCUMENTS

| | | | | |
|---|---|---|---|---|
| 5,717,924 | A | * | 2/1998 | Kawai ..................................... 1/1 |
| 5,748,975 | A | * | 5/1998 | Van De Vanter .............. 715/236 |
| 6,014,670 | A | * | 1/2000 | Zamanian et al. ..................... 1/1 |
| 6,125,442 | A | * | 9/2000 | Maves et al. ................... 712/220 |
| 6,154,876 | A | | 11/2000 | Haley et al. |
| 6,233,726 | B1 | * | 5/2001 | Bowman et al. .............. 717/107 |
| 6,286,104 | B1 | * | 9/2001 | Buhle et al. ......................... 726/4 |
| 6,339,775 | B1 | * | 1/2002 | Zamanian et al. ..................... 1/1 |
| 6,374,403 | B1 | * | 4/2002 | Darte et al. .................... 717/161 |
| 6,389,588 | B1 | * | 5/2002 | Wadhwa et al. ............... 717/106 |
| 6,507,947 | B1 | * | 1/2003 | Schreiber et al. ............. 717/160 |
| 6,631,328 | B2 | * | 10/2003 | Haugland ......................... 702/7 |
| 6,681,386 | B1 | | 1/2004 | Amin et al. |
| 7,143,101 | B2 | * | 11/2006 | Oliver et al. .......................... 1/1 |
| 7,434,205 | B1 | * | 10/2008 | Steenhagen et al. .......... 717/124 |
| 7,437,709 | B2 | * | 10/2008 | Salter ............................. 717/112 |
| 7,761,843 | B2 | | 7/2010 | Ortscheid |

(Continued)

FOREIGN PATENT DOCUMENTS

WO       WO2006057781 A2      6/2006

OTHER PUBLICATIONS

Sward, Ricky E. et al., "Re-engineering Global Variables in Ada", Ada Letters, v 24, Dec. 2004, pp. 29-33.
"The boo Programming Language", Copyright 2004-2005 Rodrigo Bareto de Oliveira, http://boo.codehaus.org/BooManifesto.pdf.

(Continued)

*Primary Examiner* — Jason Mitchell
(74) *Attorney, Agent, or Firm* — Schmeiser, Olsen & Watts, LLP; John Pivnichny

(57) ABSTRACT

There is disclosed a system and method for identifying a variable type during coding of a software program. In an embodiment, the method comprises defining a unique variable type string for the variable type, and when a unique variable type string is typed adjacent to a new variable name, converting the unique variable type string to a variable type identifier tag attached to the new variable name. Each unique variable type string may be defined as a prefix or a suffix. In another embodiment, the method further comprises defining a unique variable scope string for a variable scope, and when a unique variable scope string is typed adjacent to a new variable name, converting the variable scope to a variable scope identifier tag attached to the new variable name. The variable type identifier tag and the variable scope identifier tag may both be attached to the new variable name in a subscript font and/or superscript font.

18 Claims, 11 Drawing Sheets

(56) References Cited

U.S. PATENT DOCUMENTS

| | | | |
|---|---|---|---|
| 2002/0049698 A1* | 4/2002 | Aoyama | 707/1 |
| 2002/0184611 A1* | 12/2002 | Endejan | 717/113 |
| 2002/0199173 A1 | 12/2002 | Bowmen | |
| 2003/0046658 A1* | 3/2003 | Raghavan et al. | 717/106 |
| 2003/0056192 A1 | 3/2003 | Burgess | |
| 2004/0006765 A1* | 1/2004 | Goldman | 717/116 |
| 2005/0149907 A1* | 7/2005 | Seitz et al. | 717/108 |
| 2005/0278697 A1 | 12/2005 | Hodge | |
| 2006/0036997 A1 | 2/2006 | Low | |
| 2006/0048095 A1 | 3/2006 | Meijer et al. | |
| 2006/0221747 A1 | 10/2006 | Slavin et al. | |
| 2007/0041041 A1* | 2/2007 | Engbrocks et al. | 358/1.15 |
| 2007/0055978 A1 | 3/2007 | Meijer et al. | |
| 2007/0079267 A1* | 4/2007 | Hong et al. | 716/5 |
| 2007/0266378 A1* | 11/2007 | Fukuda | 717/139 |
| 2008/0313604 A1 | 12/2008 | Cowtan | |
| 2010/0131925 A1* | 5/2010 | Gutfleisch | 717/113 |

OTHER PUBLICATIONS

"4 Using MYSQL Programs", http://www.browardphp.com/mysql_manual_en/manual_Using_MySQL_Programs.html#Program_variables.

"5 Database Administration", http://www.browardphp.com/mysql_manual_en/manual_MySQL_Database_Administration.html.

"6 Replication in MySQL", http://www.browardphp.com/mysql_manual_en/manual_Replication.html.

Final Office Action Mail Date Feb. 15, 2013 for U.S. Appl. No. 12/125,152; filed May 22, 2008; First Named Inventor: Greg Cowtan; Conf. No. 4022.

Office Action Response filed Oct. 23, 2012 for U.S. Appl. No. 12/125,152; filed May 22, 2008; First Named Inventor: Greg Cowtan; Conf. No. 4022.

Office Action Mail Date Jul. 23, 2012 for U.S. Appl. No. 12/125,152; filed May 22, 2008; First Named Inventor: Greg Cowtan; Conf. No. 4022.

\* cited by examiner

```
DO
    LINE INPUT #FileNum, MyLine
    form1.cboList.Add MyLine
    CounterNum = CounterNum +1
LOOP WHILE NOT EOF(FileNum)
```

```
DIM FileNum as LONG
DIM MyLine as STRING
DIM CounterNum as INTEGER

...

DO
    LINE INPUT #FileNum, MyLine
    form1.cboList.Add MyLine
    CounterNum = CounterNum +1
LOOP WHILE NOT EOF(FileNum)
```

SYSTEM AND METHOD FOR VARIABLE TYPE IDENTIFICATION

REFERENCE TO RELATED APPLICATIONS

This application claims priority to Canadian Application No. 2591382 filed Jun. 12, 2007. This application also claims priority to Canadian Patent Application No. 2591361, filed Jun. 12, 2007. Both of these Canadian applications are hereby incorporated by reference as if fully set forth herein. This application also relates to Applicant's co-pending U.S. patent application Ser. No. 12/125,152, filed on even date herewith.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND OF THE INVENTION

The present invention relates to systems and methods for identifying variable types.

Errors can occur if a programmer misuses a variable by assigning the wrong data type to that variable, or is expecting a different scope of the variable.

In certain IDEs, portions of the software code such as keywords, variables, functions and numbers may be displayed to a programmer and distinguished from the main body of the code by different coloring schemes. For example, one color may be used to identify all variables, and another color may be used to identify keywords.

However, even with such coloring schemes to identify variables, the type or scope of each variable cannot be readily determined and this type of coloring scheme may be of limited use to programmers.

SUMMARY OF THE INVENTION

According to our embodiment of the invention, there is provided a method of identifying a variable type during coding of a software program, comprising the steps of defining a unique variable type string for the variable type, and when the unique variable type string is typed adjacent to a new variable name, converting the unique variable type string to a variable type identifier tag attached to the new variable name.

According to another embodiment of the invention there is provided a system for identifying a variable type during coding of a software program, the system comprising a coding module adapted to define a unique variable type string for the variable type, and when the unique variable type string is typed adjacent to a new variable name, convent the unique variable type string to a variable type identifier tag attached to the new variable name.

According to yet another embodiment of the invention, there is provided a data processor readable medium storing data processor code that when loaded onto a device adapts the device to perform a method of identifying a variable type during coding of a software program, the data processor readable medium comprising code for defining a unique variable type string for the variable type, and code for converting the unique variable type string to a variable type identifier tag attached to a new variable name when the unique variable type string is typed adjacent to the new variable name.

BRIEF DESCRIPTION OF THE DRAWINGS

In the Figures which illustrate exemplary embodiments of the invention:

FIGS. 2A to 2G show an illustrative example of declaring variables in accordance with an embodiment of the invention;

DETAILED DESCRIPTION OF THE INVENTION

As noted above, the present invention relates to a system and method for identifying variable types.

Figure 1:
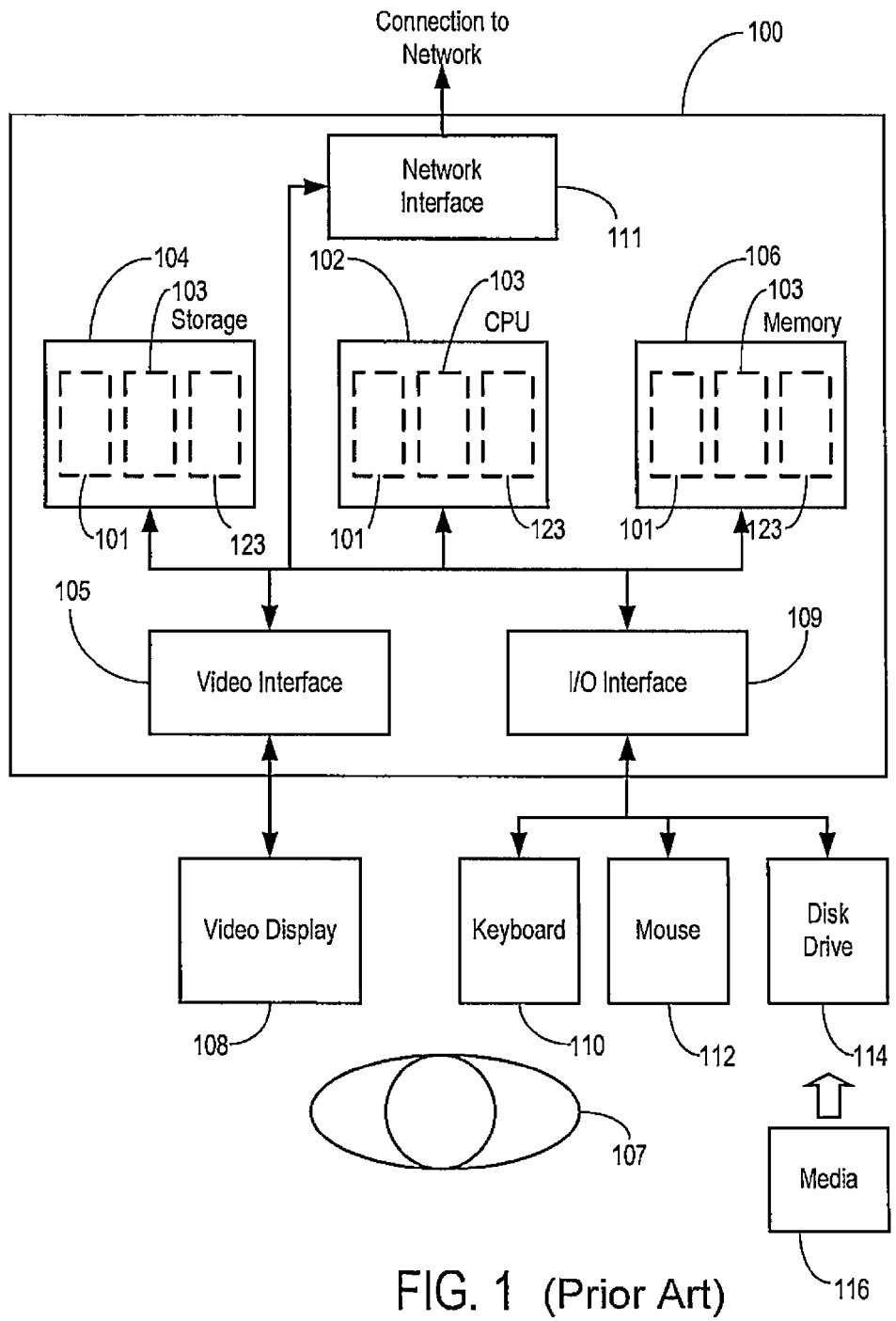
FIG. 1 shows a generic data processing system that may provide a suitable operating environment.

The invention may be practiced in various embodiments. A suitably configured data processing system, and associated communications networks, devices, software and firmware may provide a platform for enabling one or more of these systems and methods. By way of example, FIG. 1 shows a generic data processing system 100 that may include a central processing unit ("CPU") 102 connected to a storage unit 104 and to a random access memory 106. CPU 102 may process an operating system 101, application program 103, and data 123. The operating system 101, application program 103, and data 123 may be stored in storage unit 104 and loaded into memory 106, as may be required. An operator 107 may interact with the data processing system 100 using a video display 108 connected by a video interface 105, and various input/output devices such as a keyboard 110, mouse 112, and disk drive 114 connected by an I/O interface 109. In known manner, mouse 112 may be configured to control movement of a cursor in video display 108, and to operate various graphical user interface (GUI) controls appearing in the video display with a mouse button. Disk drive 114 may be configured to accept data processing system readable media 116. Data processing system 100 may form part of a network via a network interface 111, allowing the data processing system to communicate with other suitably configured data processing systems (not shown). The particular configurations shown by way of example in this specification are not meant to be limiting.

Now referring to FIGS. 2A to 2G, an illustrative example of a system for declaring variables in accordance with an embodiment of the invention is shown.

As shown in window 200A of FIG. 2A, a programmer may be coding a software program 202 when a need arises to declare some newly introduced variables. Conventionally, the programmer would declare the new variables by using declaration statements 204 near the beginning of the code, as shown by way of example in window 200B of FIG. 2B. In the illustrative example, using the Microsoft Visual Basic™ DIM statement, a FileNum variable may be declared as having a "LONG" variable type, a MyLine variable may be declared as having a "STRING" variable type; a CounterNum variable may be declared as having an "INTEGER" variable type. As noted earlier, the need to manually declare variables in this manner may add a significant workload burden on the programmer.

Figure 2C:
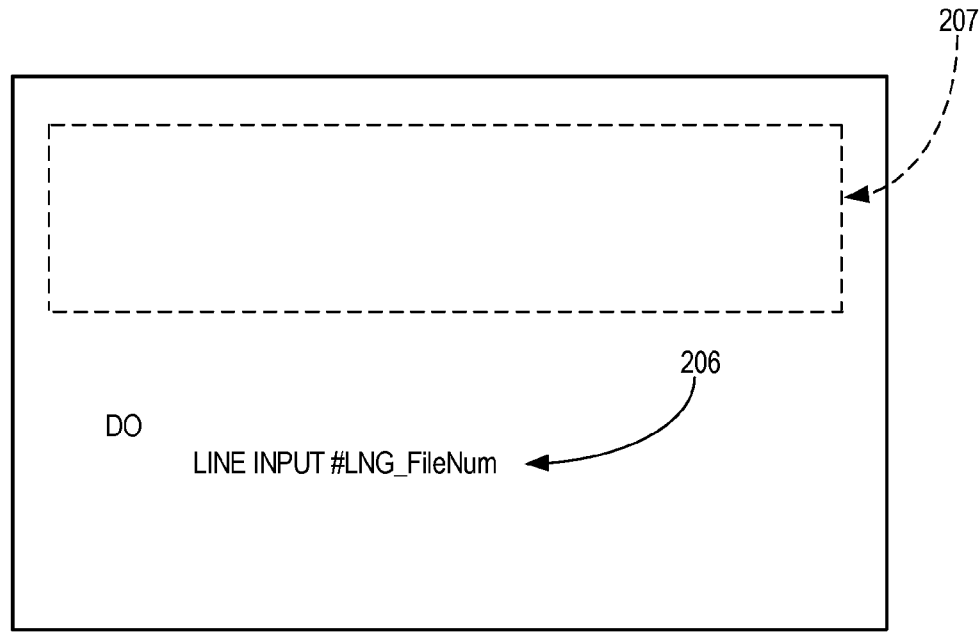

Now referring to window 200C of FIG. 2C, shown is an illustrative example of a variable declaration made using an IDE coding module (e.g. as embodied in application program 103 of FIG. 1) in accordance with an embodiment of the invention. As shown, in this illustrative embodiment, the IDE coding module may be configured to recognize a unique prefix or string of text as a variable declaration instruction. For example, the IDE coding module may be configured such that if a programmer types a predefined prefix or a string adjacent to (e.g. in front of or after) a variable name, such as shown in line 206, the IDE coding module will automatically declare the variable name as a variable type and insert this declaration statement into a reserved variable declaration area 207.

Figure 2D:
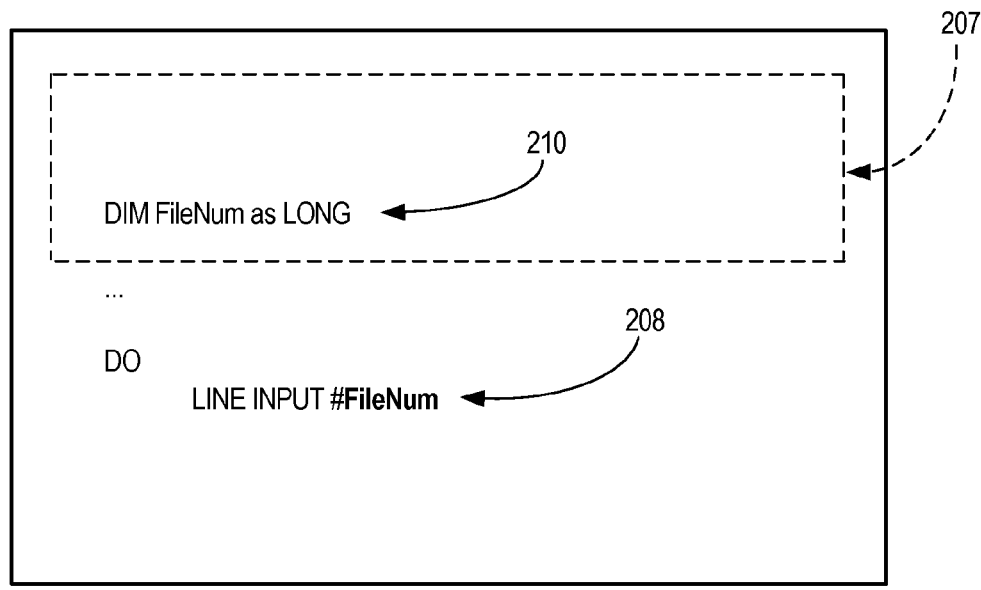

For example, as shown in window 200D of FIG. 2D if a programmer declares a new variable named "FileNum" of a LONG type, the programmer may simply type "LNG_FileNum" on a line, as shown at line 206, and the IDE coding module would then recognize "FileNum" appearing after the unique "LNG_" prefix or string as a command for a new variable of a LONG type to be declared. The IDE coding module may be configured to display this newly declared variable simply as "FileNum" without the unique "LNG_" prefix (equivalent to having been removed or deleted from line 206), as shown at line 208, and also generate the following declaration statement: "DIM FileNum as LONG" and write the statement into reserved variable declaration area 207, as shown at line 210.

If the code is in fact lengthy, it will be appreciated that reserved variable declaration area 207 may be entirely outside the viewing area of window 200D. However, the fact that the variable declaration instruction has been accepted and that "FileNum" is now recognized by the IDE coding module as a variable may be indicated, for example, by displaying "FileNum" in a different color or font, or in some other visually distinctive way. Once this is done, the IDE coding module may be configured to recognize all further instances of FileNum as being a reference to the declared variable.

Figure 2E:
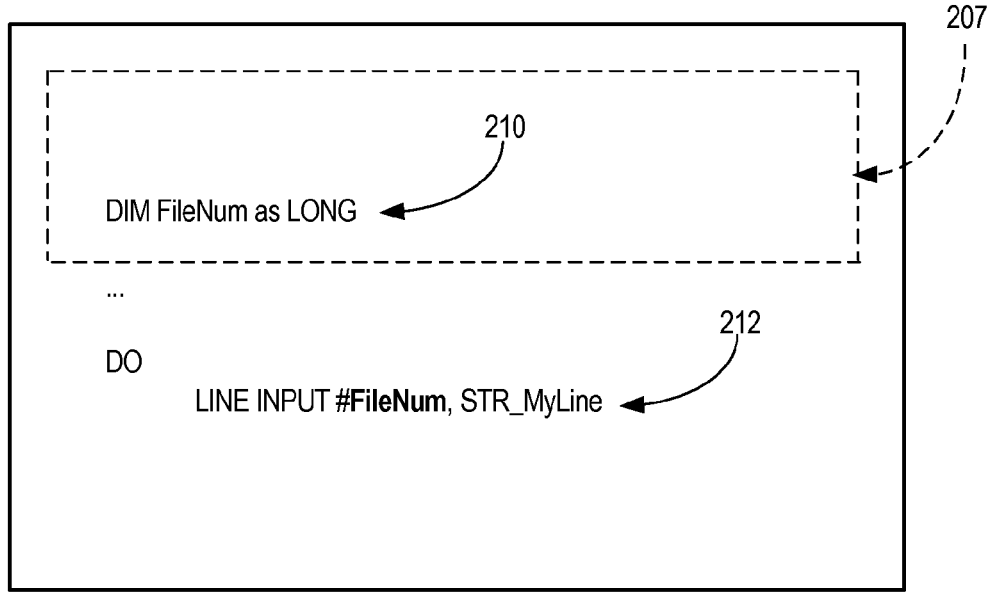
Figure 2F:
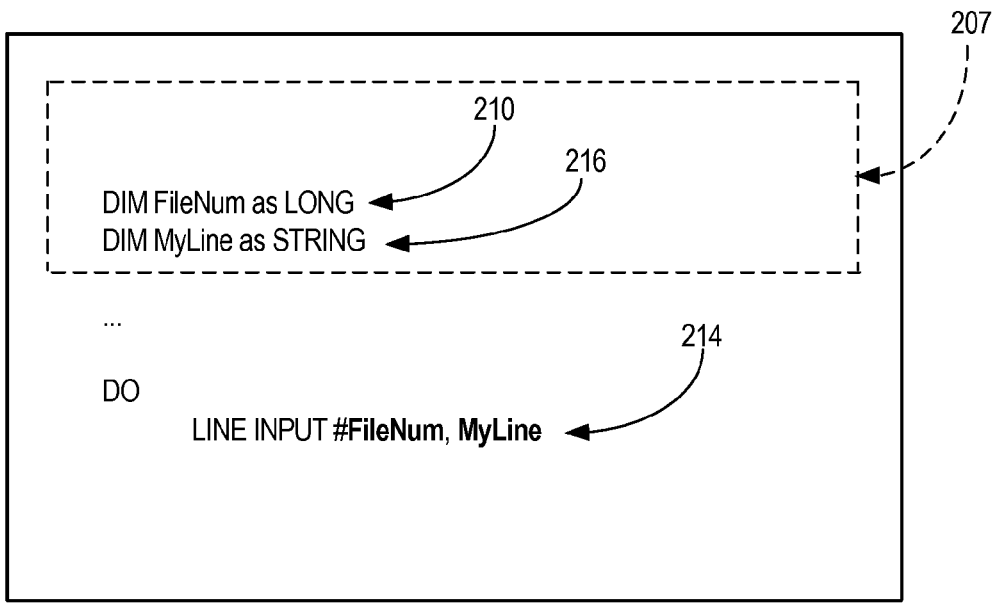

Continuing with this illustrative example, as shown in window 200E of FIG. 2E, the programmer may enter another string such as "STR_MyLine" on line 212. The IDE coding module may be configured to interpret this string as a command for a new variable "MyLine" of a STRING type to be declared. The IDE coding module may then generate the following statement "DIM MyLine as STRING" for placement into reserved variable declaration area 207, as shown at line 216 (FIG. 2F). Again, once MyLine is recognized as being a declared variable, the IDE coding module may be configured to display the variable MyLine in some visually distinctive way, such as color or font. The IDE coding module may then be configured to recognize all further instances of MyLine as a reference to the declared variable.

Now referring to window 200F in FIG. 2F, when the new variable declaration statement for "MyLine" appearing on line 214 without the "STR_" prefix (equivalent to having been removed or deleted from line 212) is added to reserved area 207, as shown at line 216, the new declaration statement may be listed in the order added. In this example, it will be appreciated that the variable declaration statements may be added to reserved area 207 in an ordered manner, such as by variable name, by variable type, or both. Thus, if ordered by variable name, and the second added variable declaration statement had a variable name starting with "A", the second added variable declaration statement would instead have been placed above the first added variable declaration statement. In this manner, if many variable declaration statements are added to reserved area 207, it will be easier to locate a particular one.

Thus, an IDE coding module may be configured to interpret a relatively short string such as "LNG_" and "STR_" in order to execute a command to declare a variable having a LONG type or STRING type, respectively. Similarly, a short string such as "INT_" could be interpreted by the IDE coding module to automatically declare a new variable having an INTEGER type. In an alternative embodiment, the IDE coding module may be configured to allow the programmer to define the strings to be used for declaring the variables. In this manner, the programmer may personalize the variable declaration instruction so that it is most convenient for him.

Figure 2G:
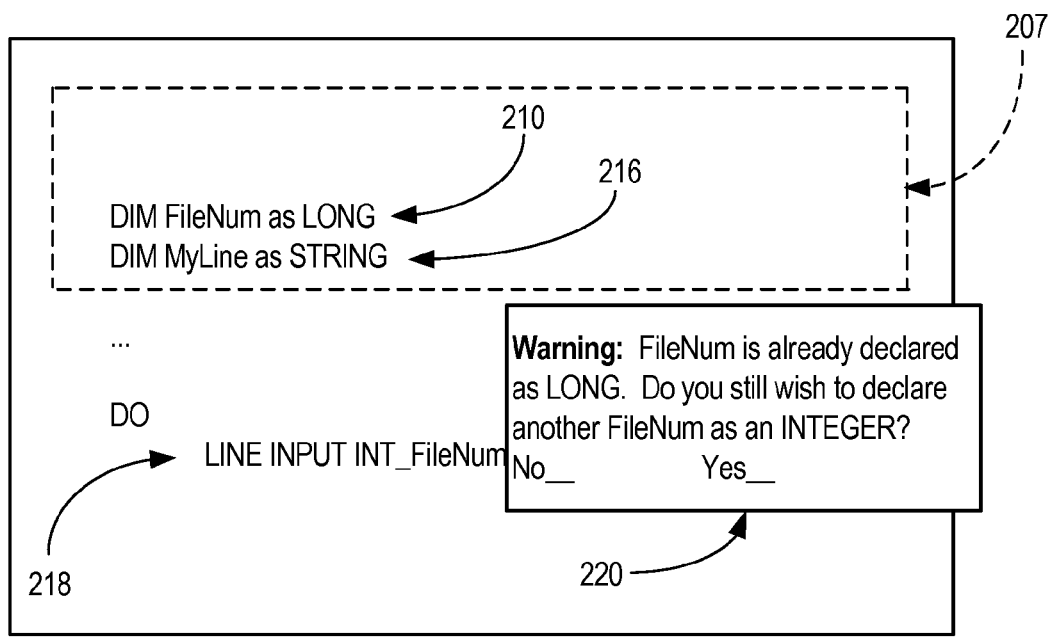

In another embodiment, as shown in window 200G in FIG. 2G, if a programmer attempts to declare the same variable name as a different type, the IDE coding module may provide a warning to the programmer that the variable is already in use as a different variable type. For example, if the programmer attempts to declare the variable FileNum as an INTEGER using "INT_FileNum" on line 218, the IDE coding module may be configured to warn the programmer using a pop-up window 220, or a message in a defined message field (not shown) that FileNum is already in use as a declared variable of a LONG type. The warning message may then provide the user with an option to continue to use the same variable name with a different variable type.

Thus, unless the IDE coding module is enabled to do so, and the programmer deliberately chooses to have two variables of the same name but different type or scope, the warning message would prompt the programmer to choose another variable name that is not already defined and in use.

In another embodiment, the IDE coding module may be configured to allow a programmer to define a set of strings which may be interpreted as the variable declaration action commands. For example, if a programmer prefers to use the full "STRING_" as a prefix or string instead of "STR_", this preference could be specified in a user interface configured for this purpose. However, it will be appreciated that shorter strings such as "STR_" will be more efficient to type and use.

In an alternative embodiment, it will be appreciated that programmable function keys on a keyboard 110 may be programmed to enter prefix strings such as "STR_", "INT_", "LNG_" etc. using a single keystroke. This may make the declaration of variables even more efficient, as the variable declaration process may be initiated using as few as one extra keystroke of a programmable key.

By configuring the IDE coding module to recognize and automatically declare variables based on a minimal number of keystrokes such as described above, a significant amount of tedious work in declaring variables may be eliminated. As declaring variables may be made significantly easier, programmers may be more likely to diligently declare all variables, thus reducing coding errors due to incorrect declaration or misuse of variables. The benefits of this approach to declaring variables will be particularly noticeable in software programs which are lengthy, and which may use many different variables.

Now referring to FIGS. 3A to 3G, shown is an illustrative example of a system for identifying variable types in accordance with an embodiment of the invention. As described above with respect to FIGS. 2A to 2G, an IDE coding module may be configured to recognize when a variable is being declared and the type of variable that is being declared by interpreting a prefix string, such as "STR_", "LNG_", and "INT_". However, once the variables have been declared, and particularly if there are many variables to keep track of, a programmer may forget the type and scope of a variable when in later use.

While some programmers may attempt to identify a variable type by using a descriptive prefix or suffix, if the variable is used often within a section of code, the programmer may be required to repeatedly type the descriptive prefix or suffix many, many times. Even with programmable keys programmed to enter a descriptive prefix, over the course of perhaps dozens or hundreds of variables, used many times within a piece of code, there may be significant keystroke overhead for the programmer.

Thus, in order to provide programmers with a more efficient way of identifying the type of declared variables, identification of a variable type and the scope of a variable may be accomplished by using a variable type identifier tag, such as a subscript and/or superscript letter, or a suitable graphic symbol, that is automatically attached to the variable name once declared.

Figure 3A:
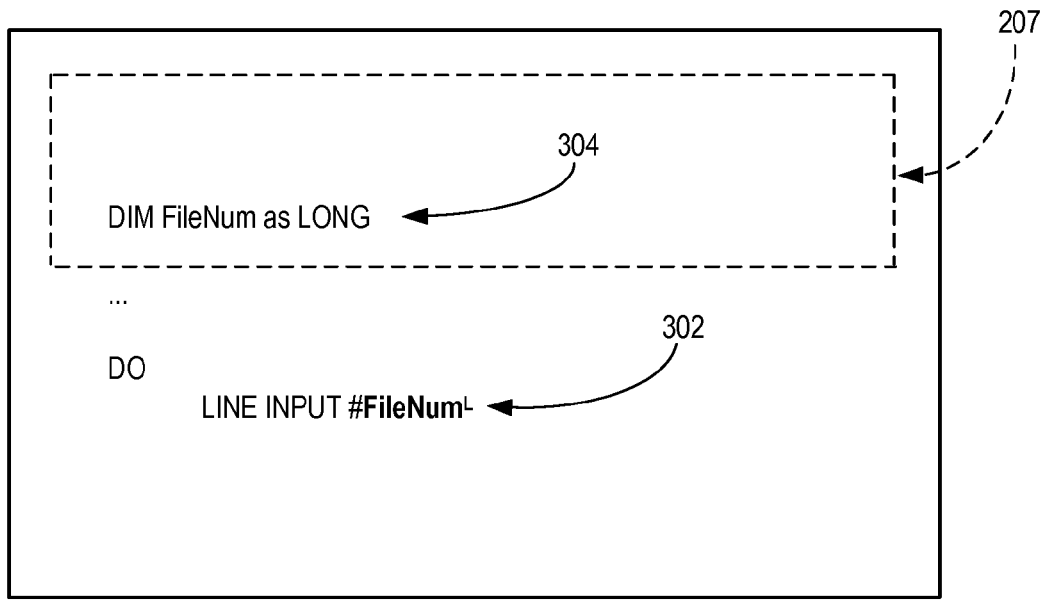
FIGS. 3A to 3G show an illustrative example of identifying variable types in accordance with an embodiment of the invention.

FIG. 3A shows an illustrative example of an IDE coding module window 300A in which the type of a declared variable is easily identified by the use of a subscript and/or superscript tag. For example, if the programmer is declaring a new variable FileNum of a LONG type, the programmer may declare the new variable in a manner similar to that described earlier with reference to FIGS. 2A to 2G, such as by entering "LNG_FileNum" on a line. As noted earlier, the IDE coding module may be configured to interpret this string as instructions to declare a variable named "FileNum" having a LONG type, and may generate the appropriate code "DIM FileNum as LONG" (shown in FIG. 3B at line 304) to insert into reserved declared variable area 207. However, once the FileNum variable has been declared in this manner, the IDE coding module may also be configured to automatically indicate the variable type using a superscript letter "L", so that the declared variable now appears as $FileNum^L$, as shown on line 302.

Figure 3B:
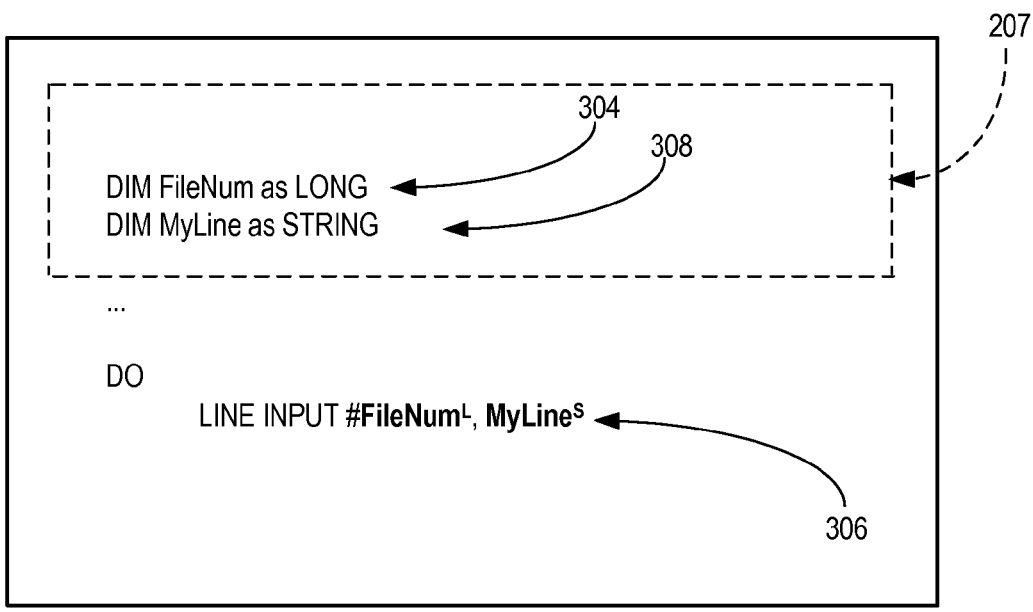

Similarly, as shown in window 300B of FIG. 3B, the MyLine variable of a STRING type may appear as $MyLine^S$ as shown on line 306. As will be appreciated, the variable type of MyLine is now easily identified just by looking at the superscript tag "S". The variable declaration statement 308 in reserved area 207 declares the variable "MyLine" as a STRING type.

Once a variable has been declared and the variable type identified in the manner described above, the IDE coding module may be configured such that each time a programmer types in the variable name, the variable type is automatically indicated by use of the superscript letter. For example, if the programmer types "FileNum" after the variable has been declared, the IDE coding module may be configured to automatically insert, upon completion of typing "FileNum" and hitting the space bar, a superscript "L" so that the variable appears as $FileNum^L$.

Figure 3C:
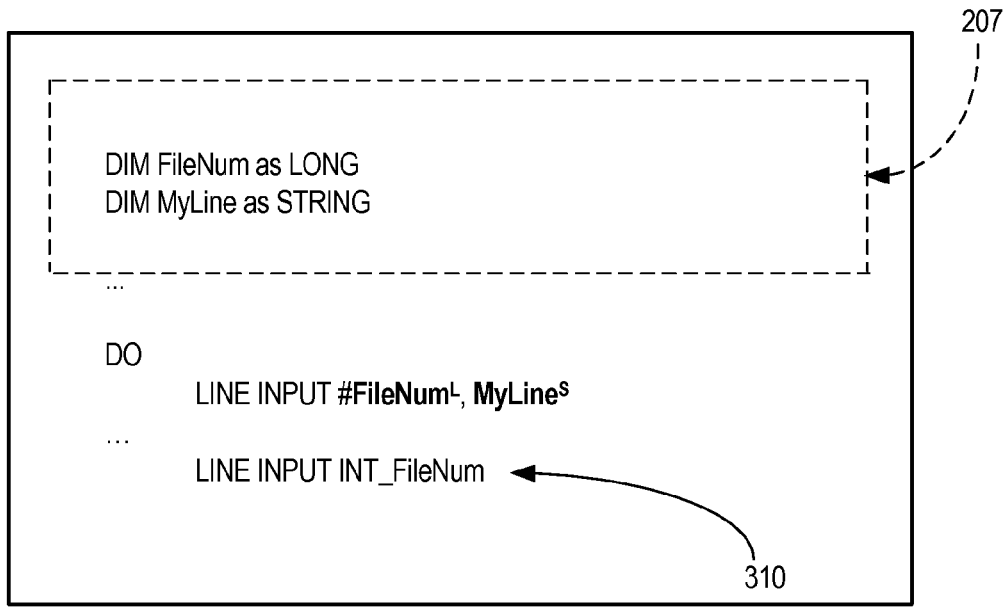
Figure 3D:
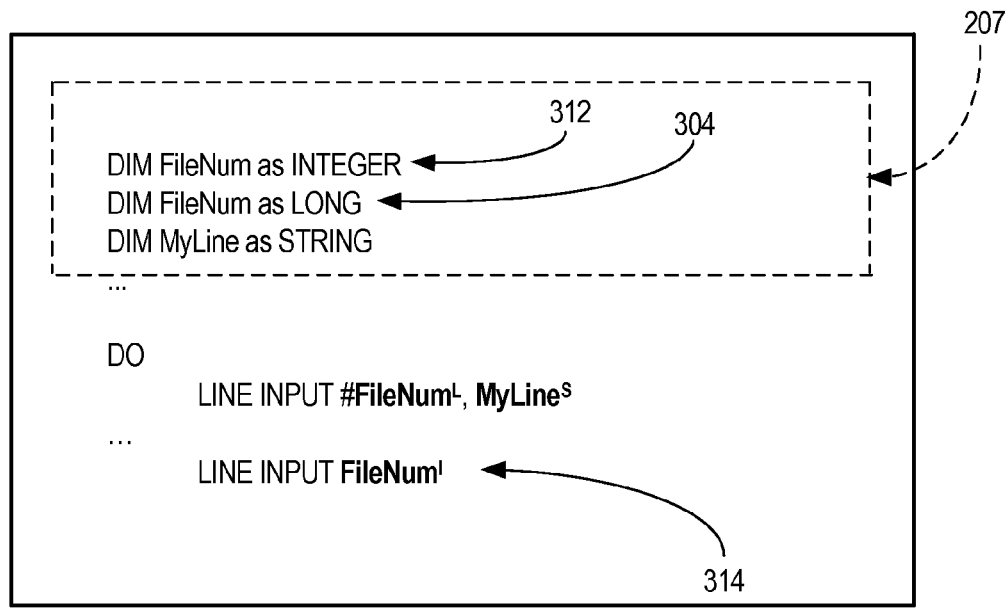

Now referring to window 300C of FIG. 3C, if the programmer decides to declare another variable of same name but having another variable type, the use of the superscript tags now allows the programmer to easily distinguish between such variables. For example, as shown at line 310, if a second variable is declared having the name FileNum, but having the type INTEGER, then this second variable may appear as $FileNum^I$ as shown at line 314 in window 300D of FIG. 3D. The declaration statement "DIM FileNum as INTEGER" may also be added to reserved declared variable area 207, as shown at line 312.

As will be appreciated, now the programmer can distinguish between the first variable $FileNum^L$ (FileNum of LONG type) and the second variable $FileNum^I$ (FileNum of INTEGER type), and assign data values to each based on type. In order to further distinguish between the two variables, $FileNum^L$ and $FileNum^I$, each variable type may also be assigned a different color, for example, for display to the programmer.

Figure 3E:
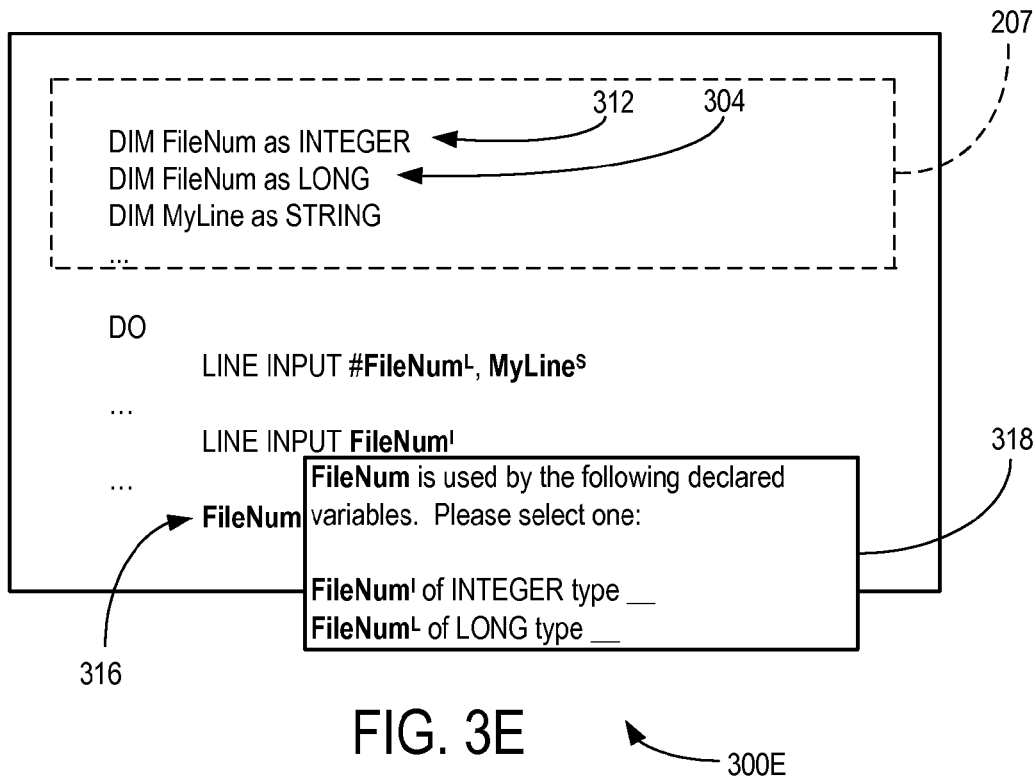
Figure 3F:
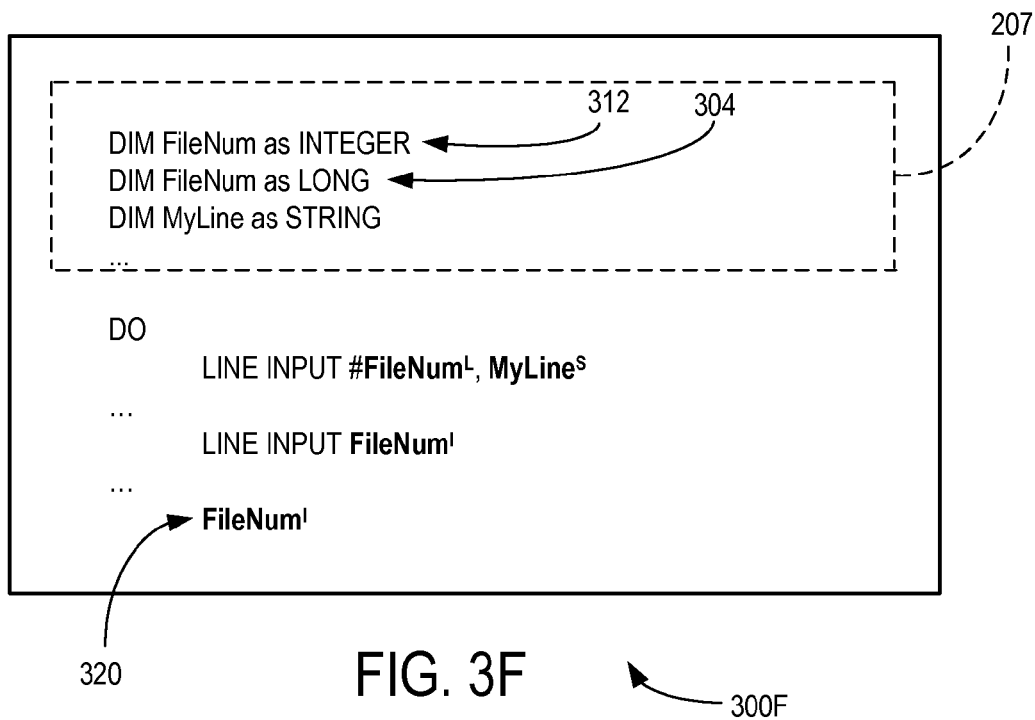

Now referring to window 300E of FIG. 3E, when the programmer attempts to use one of these two variables by typing "FileNum" as shown in line 316, the IDE coding module may be configured to provide the programmer with a selectable option, such as may be provided in a pop-up window 318 for example. As shown, pop-up window 318 may prompt the programmer to select from one of $FileNum^I$ of INTEGER type, and $FileNum^L$ of LONG type. As shown by way of example in window 300F of FIG. 3F, if the user selects $FileNum^I$ of INTEGER type, then the selected variable is shown (e.g. at line 320). It will be appreciated that the selectable option list in pop-up window 318 may be extended to virtually any number of variable types although, practically speaking, each programming language will have a limited number of variable types and variable scope.

Figure 3G:
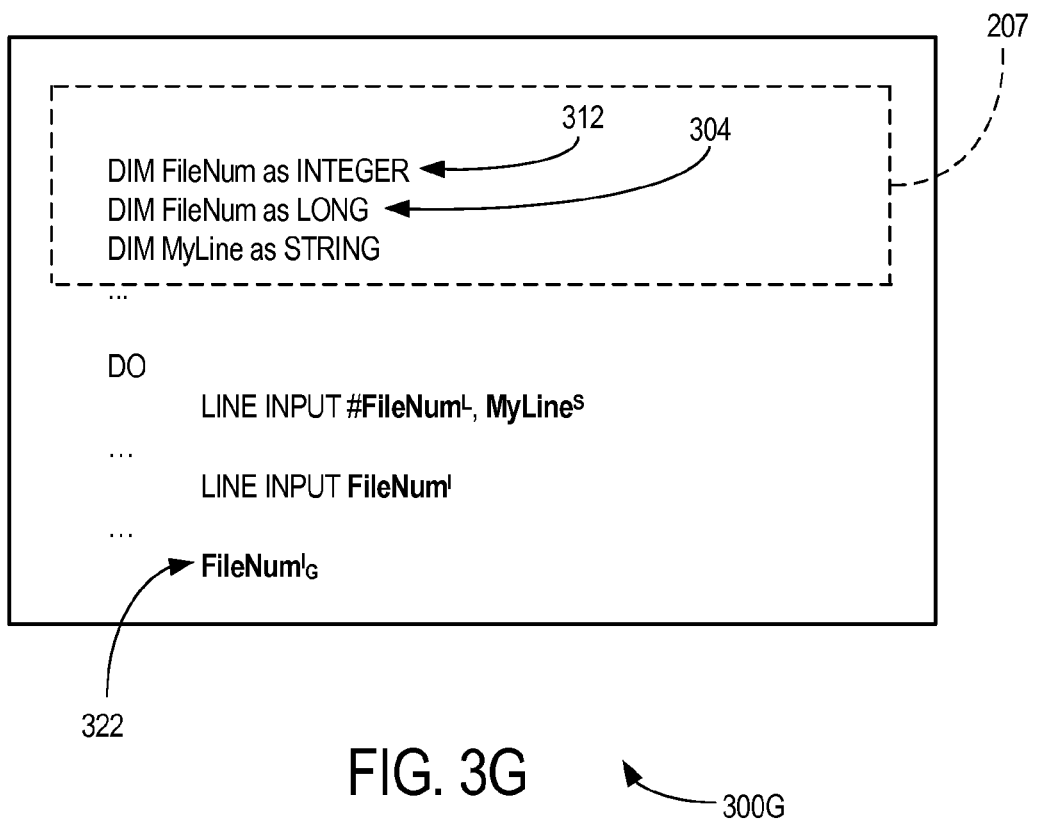

In another embodiment of the invention, in addition to the variable type, the scope of the variable may also be indicated using a compact variable scope indicator tag, such as a subscript letter. For example, as shown in FIG. 3G, if the variable FileNum of an INTEGER type is a Global variable, a suitable subscript tag may be used to indicate this: $FileNum^I_G$. This compact notation may immediately identify that the variable type is integer, and that the variable has a Global scope.

In another embodiment of the invention, as shown in window 300G of FIG. 3G, rather than using both superscript and subscript letters, a combination of superscript or subscript letters may be used as shown at line 322. As long as the convention is indicated to the programmer beforehand, the variable FileNum of an INTEGER type and Global scope may be indicated as any one of: $FileNum^I_G$, $FileNum^{IG}$, $FileNum_{IG}$, $FileNum^G_I$, etc.

Also, as noted earlier, rather than being subscript or superscript letters, some other tag or tags including alphanumeric characters or special symbols may be used to indicate the variable type and variable scope.

Figure 4:
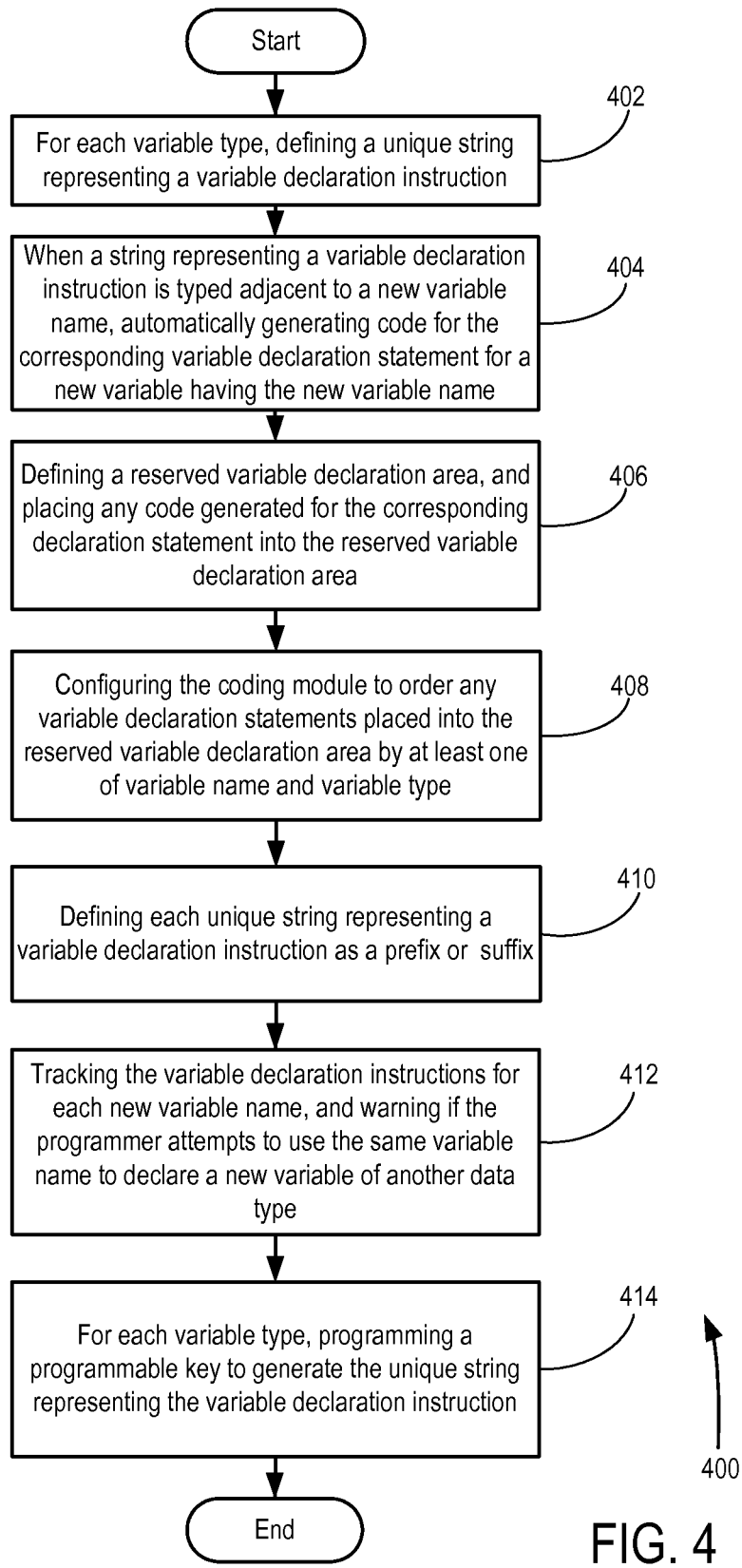
FIG. 4 shows an illustrative flowchart of a method for declaring variables in accordance with an embodiment of the invention.

Now referring to FIG. 4, shown is an illustrative flowchart of a method 400 for declaring variables in accordance with an embodiment of the invention. Method 400 starts at block 402, and for each variable type, defines a unique string representing a variable declaration instruction. For example, as shown earlier in FIG. 2C, the unique string "LNG_" may represent a variable declaration instruction for declaring a LONG variable type.

Method 400 then proceeds to block 404, where the method may adapt a coding module such that, when a string representing a variable declaration instruction is typed adjacent to a new variable name, the coding module automatically generates code for the corresponding variable declaration statement for a new variable having the new variable name. For example, as shown earlier in FIG. 2D, the corresponding variable declaration statement "DIM FileNum as LONG" may be automatically generated.

Method 400 may then proceed to block 406, where the method may define a reserved variable declaration area, and place any code generated for the corresponding variable declaration statement into the reserved variable declaration area. This is illustrated in FIG. 2D as described earlier.

Method 400 may then proceed to block 408, where the method may configure the coding module to order any variable declaration statements placed into the reserved variable declaration statement area by variable name, variable type, or both. This is illustrated in FIG. 2F, for example, where the variable declaration statements may be sorted by variable name.

Method 400 may then proceed to block 410, where the method may define each unique string representing a variable declaration instruction as a prefix or suffix. While the illustrative examples described above show prefixes being used (e.g. "LNG_FileNum"), it will be appreciated that suffixes could also be used (e.g. "FileNum_LNG" if appropriately defined.

Method 400 may then proceed to block 412, where the method may track the variable declaration instructions for each new variable name, and provide a warning if a programmer attempts to use the same variable name to declare a new variable of another type.

Method 400 may then proceed to block 414, where for each variable type the method may program a programmable key to generate the unique string representing the variable declaration instruction. Method 400 then ends.

Figure 5:
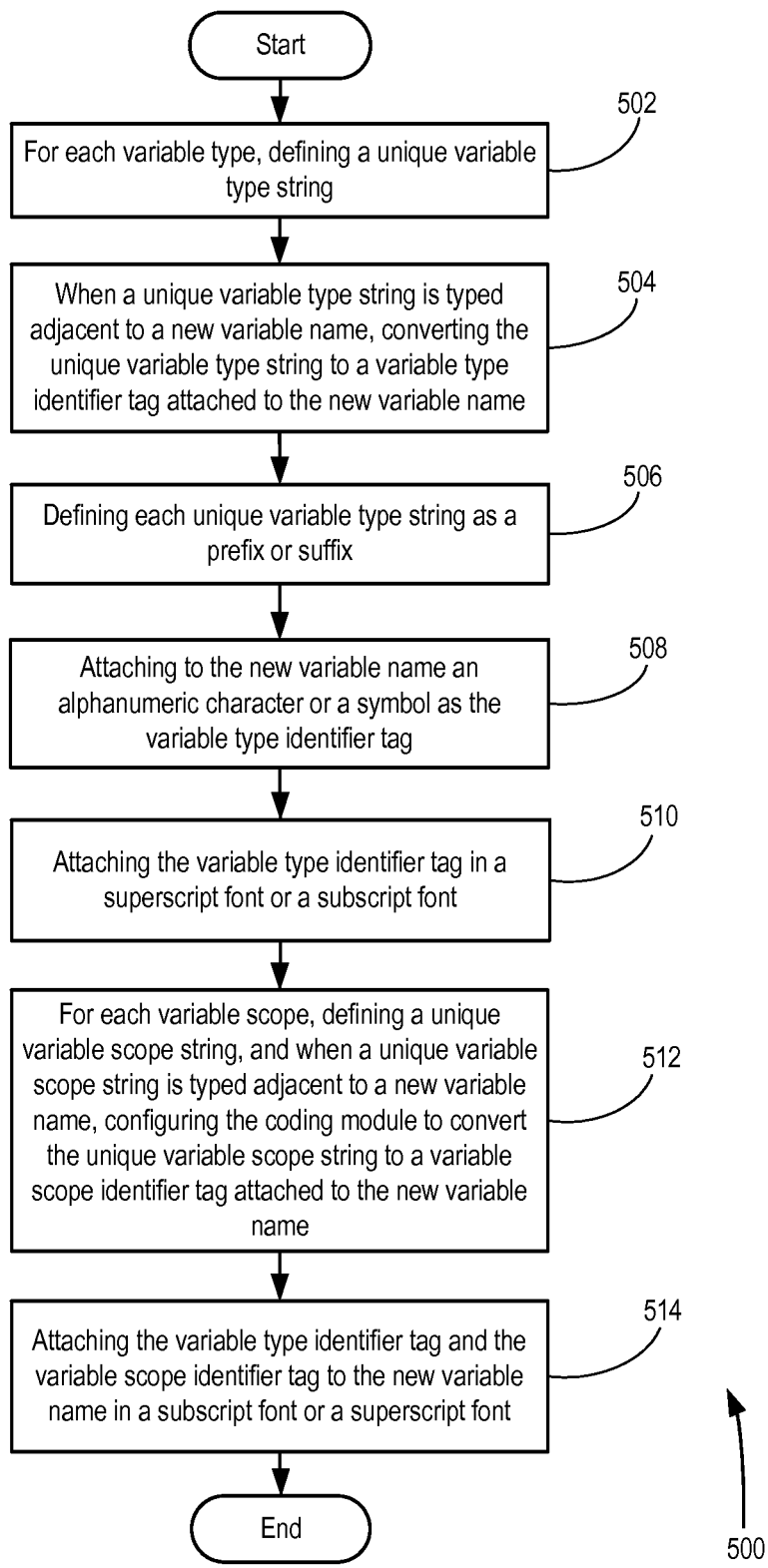
FIG. 5 shows an illustrative flowchart of a method for identifying variable types in accordance with an embodiment of the invention.

Now referring to FIG. 5, shown is an illustrative flowchart 500 of a method for identifying variable types in accordance with an embodiment of the invention. Method 500 starts and at block 502, for each variable type, defines a unique variable type string. Method 500 may then proceed to block 504, where the method may adapt a coding module such that when a unique variable type string is typed adjacent to a new variable name, the coding module converts the unique variable type string to a variable type identifier tag attached to the new variable name. This is illustrated in FIG. 2C and FIG. 3A as described earlier, where "LNG_FileNum" is converted to "FileNum$^L$".

Method 500 may then proceed to block 506, where the method may define each unique string representing a variable type as a prefix or suffix. While the illustrative examples above showed a prefix such as "LNG_", it will be appreciated that a suffix such as "_LNG" could also be recognized and converted to a variable type identifier tag.

Method 500 may then proceed to block 508, where the method may attach to the variable name an alphanumeric character or symbol as the variable type identifier tag. Thus, while the illustrative examples above showed an alphanumeric character, a unique symbol or graphic icon could also be used.

Method 500 may then proceed to block 510, where the method may attach the variable type identifier tag to the new variable name in a superscript font or a subscript font.

Method 500 may then proceed to block 512, where for each variable scope, the method may define a unique variable scope string, and when the unique variable scope string is typed adjacent to a new variable name, configuring the coding module to convert the unique variable scope string to a variable scope identifier tag attached to the new variable name. For example, as shown in FIG. 3G, a new variable FileNum may be of INTEGER type and may have a Global scope. In this case, a unique string such as "_G" typed adjacent to a new variable name may be used to indicate a variable having a Global scope. This may be converted to a variable scope identifier tag "G" attached to the new variable FileNum.

Method 500 may then proceed to block 514, where the method may attach both the variable type identifier tag, and the variable scope identifier tag to the new variable name in a subscript font or superscript font. For example, the string "INT_FileNum_G" many be converted to "FileNum$^I_G$", where the superscript "I" indicates that FileNum is an INTEGER type, and the subscript "G" indicates that FileNum has a Global scope. Method 500 then ends.

While various illustrative embodiments of the invention have been described above, it will be appreciated by those skilled in the art that variations and modifications may be made. Thus, the scope of the invention is defined by the following claims.

What is claimed is:

1. A method of identifying a variable type during coding of a software program written in a programming language, said method implemented by use of a processor of a data processing system, said method comprising:

said processor receiving a first typed line of a software program from a programmer, said first typed line including a variable name of a variable and a first variable type string adjacent to the variable name, said first variable type string identifying a first variable type of the variable;

said processor displaying the first typed line in a window;

said processor generating a first declaration statement for the software program, said generating the first declaration statement determining the first variable type from the first variable type string, said first declaration statement including a first standard character string of the programming language that specifies the first variable type of the variable, said first standard character string differing from the first variable type string;

said processor inserting the first declaration statement in a reserved variable declaration area of the window, said reserved variable declaration area being displayed in the window and configured to record declaration statements of the software program; and said processor displaying a first modified line in the window, said first modified line replacing the first typed line in the window, said first modified line consisting of a portion of the first typed line that does not include the first variable type string.

2. The method of claim 1, said method further comprising;

after said displaying the first modified line, said processor receiving a second typed line of the software program from the programmer, said second typed line including the variable name of the variable and a second variable type string adjacent to the variable name, said second variable type string identifying a second variable type of the variable, said second variable type differing from the first variable type, said second variable type string differing from the first variable type string;

said processor displaying the second typed line in the window;

said processor generating a second declaration statement for the software program, said generating the second declaration statement determining the second variable type from the second variable type string, said second declaration statement including a second standard character string of the programming language that specifies the second variable type of the variable, said second standard character string differing from the second variable type string;

said processor inserting the second declaration statement in the reserved variable declaration area of the window; and said processor displaying a second modified line in the window, said second modified line replacing the second typed line in the window, said second modified line consisting of a portion of the second typed line that does not include the second variable type string.

3. The method of claim 2, said method further comprising;

after said displaying the second typed line and before said generating the second declaration statement and before said inserting the second declaration statement in the reserved variable declaration area, said processor displaying a pop-up window which displays a warning to the programmer that the variable is already in use as a different variable type; and in response to the warning, said processor receiving from the programmer a directive to use the second variable type for the variable in the second typed line, wherein the first variable type is being used for the variable in the first typed line.

4. The method of claim 2, wherein the variable name consists of characters, wherein the displayed first modified line and the displayed second modified line both display the characters of the variable name in a manner that visually distinguishes the first and second variable type in the displayed first and second modified lines, respectively.

5. The method of claim 4, said method further comprising:
while the second modified line is being displayed in the window and while the second declaration statement is being displayed in the reserved variable declaration area of the window, said processor displaying the variable in another line elsewhere in the window in a manner indicating that the variable in the another line is of the second variable type and is a global variable.

6. The method of claim 4, said method further comprising;
after said displaying the second modified line, said processor receiving a third typed line of the software program from the programmer, said third typed line including the variable name of the variable and no indication of the variable type of the variable;
in response to said receiving the third typed line, said processor displaying a pop-up window which displays the first and second variable types and which prompts the programmer to select from the first and second variable types in the pop-up window to designate a desired variable type of the variable in the third typed line;
said processor receiving a selection from the programmer of the first or second variable type in the pop-up window;
said processor designating the selected first or second variable type as the desired variable type of the variable in the third typed line; and
said processor displaying the desired variable type of the variable in the third typed line.

7. A data processing system comprising a processor, a memory coupled to the processor, and a computer readable storage device coupled to the processor, said storage device containing program code configured to be executed by the processor via the memory to implement a method of identifying a variable type during coding of a software program written in a programming language, said method comprising:
said processor receiving a first typed line of a software program from a programmer, said first typed line including a variable name of a variable and a first variable type string adjacent to the variable name, said first variable type string identifying a first variable type of the variable;
said processor displaying the first typed line in a window;
said processor generating a first declaration statement for the software program, said generating the first declaration statement determining the first variable type from the first variable type string, said first declaration statement including a first standard character string of the programming language that specifies the first variable type of the variable, said first standard character string differing from the first variable type string;
said processor inserting the first declaration statement in a reserved variable declaration area of the window, said reserved variable declaration area being displayed in the window and configured to record declaration statements of the software program; and
said processor displaying a first modified line in the window, said first modified line replacing the first typed line in the window, said first modified line consisting of a portion of the first typed line that does not include the first variable type string.

8. The method of claim 7, said method further comprising;
after said displaying the first modified line, said processor receiving a second typed line of the software program from the programmer, said second typed line including the variable name of the variable and a second variable type string adjacent to the variable name, said second variable type string identifying a second variable type of the variable, said second variable type differing from the first variable type, said second variable type string differing from the first variable type string;
said processor displaying the second typed line in the window;
said processor generating a second declaration statement for the software program, said generating the second declaration statement determining the second variable type from the second variable type string, said second declaration statement including a second standard character string of the programming language that specifies the second variable type of the variable, said second standard character string differing from the second variable type string;
said processor inserting the second declaration statement in the reserved variable declaration area of the window; and
said processor displaying a second modified line in the window, said second modified line replacing the second typed line in the window, said second modified line consisting of a portion of the second typed line that does not include the second variable type string.

9. The system of claim 8, said method further comprising;
after said displaying the second typed line and before said generating the second declaration statement and before said inserting the second declaration statement in the reserved variable declaration area, said processor displaying a pop-up window which displays a warning to the programmer that the variable is already in use as a different variable type; and
in response to the warning, said processor receiving from the programmer a directive to use the second variable type for the variable in the second typed line, wherein the first variable type is being used for the variable in the first typed line.

10. The system of claim 8, wherein the variable name consists of characters, wherein the displayed first modified line and the displayed second modified line both display the characters of the variable name in a manner that visually distinguishes the first and second variable type in the displayed first and second modified lines, respectively.

11. The system of claim 10, said method further comprising:
while the second modified line is being displayed in the window and while the second declaration statement is being displayed in the reserved variable declaration area of the window, said processor displaying the variable in another line elsewhere in the window in a manner indicating that the variable in the another line is of the second variable type and is a global variable.

12. The system of claim 10, said method further comprising;

after said displaying the second modified line, said processor receiving a third typed line of the software program from the programmer, said third typed line including the variable name of the variable and no indication of the variable type of the variable;

in response to said receiving the third typed line, said processor displaying a pop-up window which displays the first and second variable types and which prompts the programmer to select from the first and second variable types in the pop-up window to designate a desired variable type of the variable in the third typed line;

said processor receiving a selection from the programmer of the first or second variable type in the pop-up window;

said processor designating the selected first or second variable type as the desired variable type of the variable in the third typed line; and said processor displaying the desired variable type of the variable in the third typed line.

13. A hardware storage device comprising computer readable program code stored therein, said program code configured to be executed by a processor of a data processing system to implement a method of identifying a variable type during coding of a software program written in a programming language, said method comprising:

said processor receiving a first typed line of a software program from a programmer, said first typed line including a variable name of a variable and a first variable type string adjacent to the variable name, said first variable type string identifying a first variable type of the variable;

said processor displaying the first typed line in a window;

said processor generating a first declaration statement for the software program, said generating the first declaration statement determining the first variable type from the first variable type string, said first declaration statement including a first standard character string of the programming language that specifies the first variable type of the variable, said first standard character string differing from the first variable type string;

said processor inserting the first declaration statement in a reserved variable declaration area of the window, said reserved variable declaration area being displayed in the window and configured to record declaration statements of the software program; and said processor displaying a first modified line in the window, said first modified line replacing the first typed line in the window, said first modified line consisting of a portion of the first typed line that does not include the first variable type string.

14. The hardware storage device of claim 13, said method further comprising;

after said displaying the first modified line, said processor receiving a second typed line of the software program from the programmer, said second typed line including the variable name of the variable and a second variable type string adjacent to the variable name, said second variable type string identifying a second variable type of the variable, said second variable type differing from the first variable type, said second variable type string differing from the first variable type string;

said processor displaying the second typed line in the window;

said processor generating a second declaration statement for the software program, said generating the second declaration statement determining the second variable type from the second variable type string, said second declaration statement including a second standard character string of the programming language that specifies the second variable type of the variable, said second standard character string differing from the second variable type string;

said processor inserting the second declaration statement in the reserved variable declaration area of the window; and said processor displaying a second modified line in the window, said second modified line replacing the second typed line in the window, said second modified line consisting of a portion of the second typed line that does not include the second variable type string.

15. The hardware storage device of claim 14, said method further comprising;

after said displaying the second typed line and before said generating the second declaration statement and before said inserting the second declaration statement in the reserved variable declaration area, said processor displaying a pop-up window which displays a warning to the programmer that the variable is already in use as a different variable type; and in response to the warning, said processor receiving from the programmer a directive to use the second variable type for the variable in the second typed line, wherein the first variable type is being used for the variable in the first typed line.

16. The hardware storage device of claim 14, wherein the variable name consists of characters, wherein the displayed first modified line and the displayed second modified line both display the characters of the variable name in a manner that visually distinguishes the first and second variable type in the displayed first and second modified lines, respectively.

17. The hardware storage device of claim 16, said method further comprising:

while the second modified line is being displayed in the window and while the second declaration statement is being displayed in the reserved variable declaration area of the window, said processor displaying the variable in another line elsewhere in the window in a manner indicating that the variable in the another line is of the second variable type and is a global variable.

18. The hardware storage device of claim 16, said method further comprising;

after said displaying the second modified line, said processor receiving a third typed line of the software program from the programmer, said third typed line including the variable name of the variable and no indication of the variable type of the variable;

in response to said receiving the third typed line, said processor displaying a pop-up window which displays the first and second variable types and which prompts the programmer to select from the first and second variable types in the pop-up window to designate a desired variable type of the variable in the third typed line;

said processor receiving a selection from the programmer of the first or second variable type in the pop-up window;

said processor designating the selected first or second variable type as the desired variable type of the variable in the third typed line; and said processor displaying the desired variable type of the variable in the third typed line.

* * * * *